June 10, 1969 TADAHIRO SEKIMOTO 3,449,675

SIGNAL TRANSMISSION SYSTEM WITH REDUNDANCY REDUCTION

Filed Oct. 31, 1967 Sheet 1 of 2

INVENTOR.
TADAHIRO SEKIMOTO

BY

Hopgood & Calimafde
ATTORNEYS

INVENTOR.
TADAHIRO SEKIMOTO
BY
Hopgood & Calimafde
ATTORNEYS

United States Patent Office 3,449,675
Patented June 10, 1969

3,449,675

SIGNAL TRANSMISSION SYSTEM WITH REDUNDANCY REDUCTION

Tadahiro Sekimoto, Tokyo, Japan, assignor to Nippon Electric Company, Limited, Tokyo, Japan, a corporation of Japan Continuation-in-part of application Ser. No. 409,672, Nov. 9, 1964. This application Oct. 31, 1967, Ser. No. 679,362
Claims priority, application Japan, Nov. 7, 1963, 38/60,067
Int. Cl. H04b 1/00, 7/00
U.S. Cl. 325—38 5 Claims

ABSTRACT OF THE DISCLOSURE

A PCM communication system wherein redundancy is minimized by employing the correlation between two consecutive samples of an analogue signal. Because of the correlation, the number of combinations of possible successive samples will be less than the total number of combinations in the absence of correlation. The present invention employs a PCM encoder at the transmitter in combination with a shift register for storing two consecutive signal samples, two diode matrices, and a terminal board connecting the matrices. The output terminals of the first matrix at which an output will not appear due to correlation are then unconnected to the second diode matrix which is smaller and defines the pulse signal to be transmitted.

CROSS REFERENCE

Figure 1:
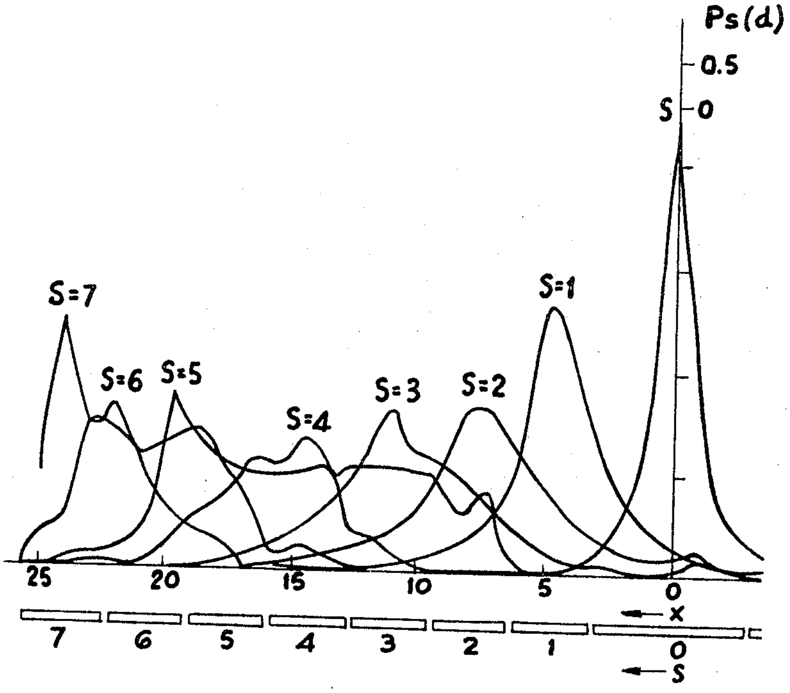

This is a continuation-in-part of my copending application Ser. No. 490,672, now abandoned, entitled, "Transmitter and a Receiver for a Code Transmission System," and filed on Nov. 9, 1964.

BACKGROUND OF THE INVENTION

PCM transmission is a typical digital transmission system now being employed because of its insusceptibility to degradation and noise. With this type system, however, the frequency bandwidth occupied by the transmission signal is unsatisfactorily large. In order to compress the bandwidth, delta-modulation has been proposed, in which only the differences in consecutive samples are coded and transmitted instead of the samples themselves. Such delta-PCM systems are well known and an excellent detailed description may be seen by reference to "On A Code-modulation Communication System," paper No. 1069, published in "1958 Denki Si-gakkai Rengo Taikai Ronbun-Shu (Proceedings of) 1958 General Joint Meeting of Four Institutes of Electrical Engineers of Japan," which was read at the general joint meeting. Redundancy reduction by the delta-PCM system is, however, still unsatisfactory, because only the difference in every two successive samples is taken into consideration.

It is therefore the object of this invention to provide a signal transmission system with improved band-compression transmission capability.

This invention is predicated on the fact that most communication signals are not random, but exhibit a considerable degree of correlation. For example, when every two consecutive samples of an aural signal are observed, the value of the second sample is dependent on the first one. The dependence of the second sample on the first one is called correlation. It has been discovered that as compared with the case of no correlation, a reduction in the number of various combinations of a predetermined number of consecutive samples of an analogue signal is found when correlation exists. Accordingly, transmission, preferably in digital form, of only numbers designating each of the various sample combinations makes it possible to reduce the signal redundancy and to compress the bandwidth.

SUMMARY AND QUANTITATIVE DESCRIPTION

Successive samples, derived in a coding device by sampling an input analogue signal at a sampling frequency greater than twice the maximum frequency contained in input analogue signal, exhibit the above-mentioned correlation so long as the analogue signal is not random noise. The possible value of a sample is restricted within a range which is substantially defined by the preceding sample.

If the number of quantization levels employed in the coder is $q$, and if there is no correlation among sampled values, $r$ in number, then the number $Qo$ of possible combinations of these sampled values is $$Qo=q^r \qquad (1)$$

Thus, the number $Mo$ of bits required to encode, into $m$-digit $n$-ary digital code words, the numbers which designate each of the sample combinations, is expressed by $$Mo=r\,m \qquad (2)$$

Since the conventional PCM transmission system does not take the correlation into consideration, an information of $Mo$ digits has to be transmitted in order to communicate $Qo$ varieties of the sample combinations.

Because of the correlation, however, the number of the actually possible sample combinations is smaller than $Qo$. As will be detailed later with reference to the drawings, if a sample $Si$ of an aural signal is within the range covered by quantization step Y ($Y=1, 2, 3 \ldots q$), the succeeding sample $Si+1$ may unfailingly be predicted within the quantizing steps $Y+5$. Consequently, the combination of a sampled value falling in quantization step Y and the next sample falling in quantization step $Y+10$ need not be taken into consideration. As a result, the number Q, of possible combinations of $r$ successive sampled values is given by $$Q=k_r q^r \qquad (3)$$

and the number M, of bits required to encode, into $m$-digit $n$-ary code words, the numbers designating each of possible sample combinations is expressed by $$M=rm+\log_n k_r \qquad (4)$$

where $k_r$ is a constant determined by the degree of compression, which approaches zero as the correlation increases and which becomes unity in the case of no correlation. Since the second term $\log_n k_r$ of the right-hand side of Equation 4 is always negative, the number M of Equation 4 is apparently smaller than $Mo$ of Equation 2. More precisely, the number of digits to be transmitted is reduced by $$\left|\log_n k_r\right|$$

bits. It would be apparent therefore that a compression in bandwidth is possible.

To estimate the degree of redundancy reduction per sample, the number of bits to be transmitted can be reduced by $$\left|\log_n k_r\right| / \left|r\right|$$

because the number $M_1$ of digits required to transmit the information of one sampled value is expressed by $$M_1=M/r=m+(\log_n k_r)/r$$

The above mentioned and other features and objects of this invention and the manner of attaining them will become more apparent and the invention itself will best be understood by reference to the following description of an embodiment of the invention taken in conjunction with the accompanying drawings, the description of which follows.

*Detailed description of the drawings*

Figure 2:
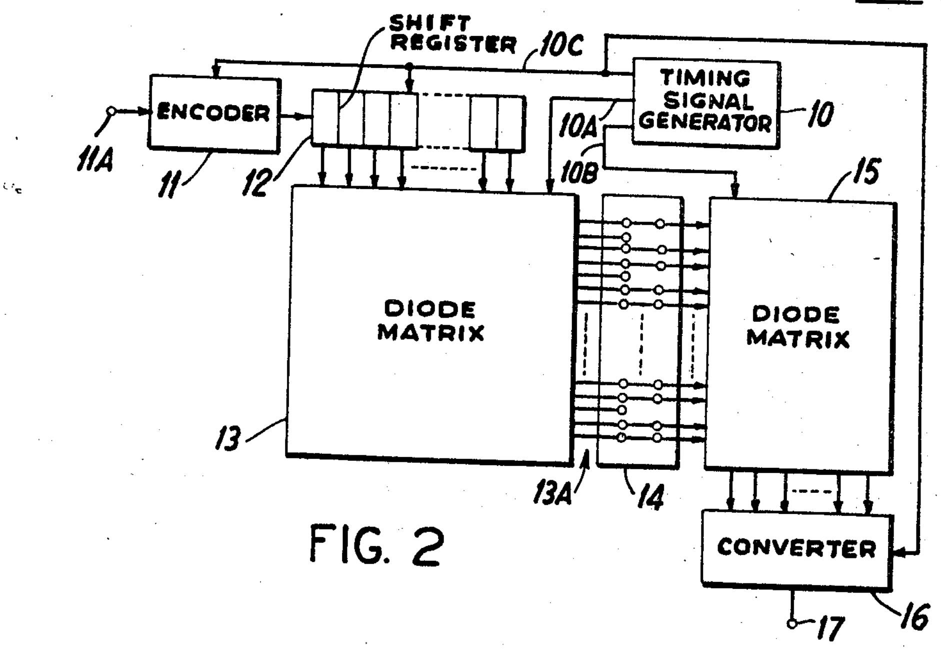
Figure 3:
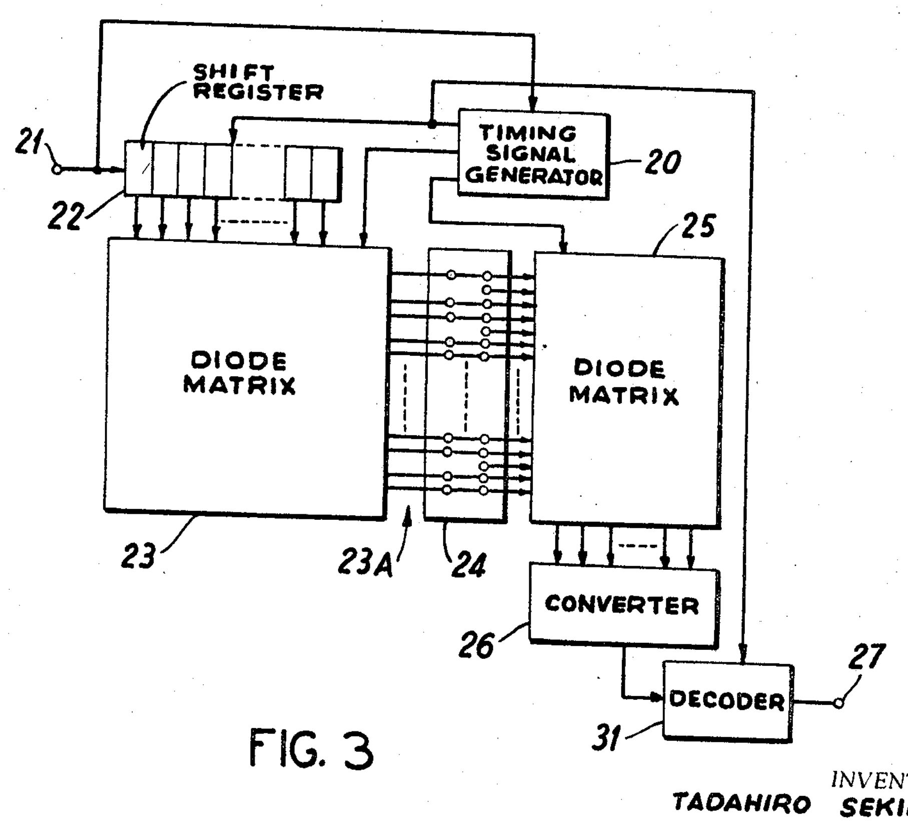

FIG. 1 is a graph to be used in explaining the principle of signal redundancy reduction according to the present invention, and FIGS. 2 and 3 are block diagrams showing transmitting and receiving equipments respectively of an embodiment of the present invention.

In FIG. 1, the abscissa represents the magnitude X of a sample. The abscissa is divided into quantization steps, or ranges, S which indicate the magnitudes for each quantization range. For example, magnitudes of samples around zero are in region $S=0$; magnitudes of samples around $X=5$ are in region $S=1$; magnitudes of samples around $X=7.5$ are in region $S=2$; and so forth.

In order to clarify the curves, the derivation of $S=1$ will first be explained. The first sample of an aural signal falls in any part of region 1 (assume the lowest possible magnitude) and then the next sample is measured. If we make this measurement continuously based on only one starting point in region 1, we shall obtain a distribution. The distribution is a function of difference *d* in magnitude between the two consecutive samples knowing the magnitude of the first sample falls in range $S=1$. Now we move to a new point in region 1 and obtain another distribution in the same manner. We continue across region 1 until we have a family of curves for region 1. The curve $S=1$ represents the average of all the curves measured in region 1, and represents the average of two consecutive samples knowing that the first sample was in region 1. The probability $P_S(d)$ in region 1 is seen on the vertical scale. The value *d* is always measured relative to the region $d=0$ at the center of each region. These measurements were made for each region and are given on FIG. 1.

It will be understood from FIG. 1 that if the magnitude of a sample falls in the quantization range 1 ($S=1$), the next following sample is expected to fall in the region ranging from $X=-5$ to $X=+15$. In other words, the change in the number of quantization steps is restricted within the ranges $S=3$, 2, 1, 0, or $-1$, when the change is initiated from the range $S=1$. It is not necessary to predict the change from $S=1$ to $S=4$, $S=7$, $S=2$, or $S=-7$. It follows therefore that only five combinations ($S=1$ to $S=3$; $S=1$ to $S=2$; $S=1$ to $S=1$; $S=1$ to $S=0$; and $S=1$ to $S=-1$) are expected as to the first sample falling in the range $S=1$. The same applies to other cases where the first sample is not in $S=1$ range. It would be apparent therefore that the number of the possible combinations of the consecutive sample magnitudes is considerably restricted.

Taking the experimental results of FIG. 1 into consideration, and assuming that $r=2$, $m=7$, and $n=2$ (combinations of *two* successive sample magnitudes are encoded into *7-digit binary* codewords), the constant $k_2$ is 0.3 (five possible combinations out of fifteen entire combinations), which means that the signal redundancy reduction per sample is 0.87 bit (about 1 bit out of 7 bits is reduced). If the so-called overload noise is allowed, the value of $k_2$ can be made much smaller to further reduce the signal redundancy without impairing the speech quality.

FIG. 2 shows one embodiment of the signal transmitter of the invention. Timing signal generator 10 provides the reference pulses for the system. An encoder 11 samples the input analogue signal from input terminal 11A and encodes each of the sampled values into a 7-digit binary codeword. Shift register 12 temporarily stores the coded signal and converts it into a 14-digit parallel binary signal. A diode matrix 13 is responsive to every 14-digit binary codeword for producing an output voltage at one of $2^{14}$ terminals 13A (or, in other words, for converting 14-digit binary codeword into 1-digit $2^{14}$-ary signal). Terminal board 14 connects those terminals among $2^{14}$ terminals 13A at which the output voltages of the diode matrix 13 are expected to appear when the correlation is taken into consideration. A second diode matrix 15 converts the output of the first diode matrix 13, supplied through terminal board 14, into a 12-digit parallel binary codewood and parallel-serial converter 16 converts the 12-digit parallel binary codewood into a series presentation to an output terminal 17 which is connected to the transmission means (not shown).

Encoder 11 may be constructed as disclosed in "Companded Coder for an Experimental PCM Terminal," Bell System Technical Journal, January issue, 1962, pages 173 to 226. Shift register 12 and diode matrices 13 and 15 are of the well known type and hence are not described further. It bears mentioning that recently developed integrated circuit techniques will facilitate miniaturization of the diode matrices even where the number of output terminals is large. The parallel-serial converter may be constructed with a rotary switch or an electronic switching device equivalent thereto.

For the transmitter of FIG. 2 to be operative, appropriately related timing signals must be supplied from timing signal source 10 to coder 11, shift register 12, diode matrices 13 and 15, and converter 17. The timing signal supplied through lead 10A to diode matrix 13 should have a repetition frequency at 1/14 of the clock pulse frequency since it serves as the read-out signal for the diode matrices 13 and 15, and converter 17. The timing signal which is being updated bit by bit, may be converted into $2^{14}$-ary output signal at every 14-digit interval. The timing signal for the other diode matrix 15, and supplied through lead 10B, has a repetition frequency of 1/12 of the clock pulse frequency for a similar purpose. Encoder 11, shitft register 12, and converter 16 are supplied through lead 10C with clock pulses directly or through suitable dealy means not shown. Further detailed examination of the timing relation shall be omitted in order not to unduly complicate this disclosure with matters not directly related to the invention.

Each of the samples derived from the input analogue signal at docer 11 is encoded and then applied to shift register 12. In the shift register 12, two codewords or 14 digits are stored. The 14-digit codeword is updated bit by bit in response to clock pulse and digital signal supplied from encoder 11. The two codewords are read out by diode matrix 13 at every 14-digit interval, so that two codewords corresponding to two consecutive samples may be converted into $2^1$-ary output signal.

Inasmuch as the input to diode matrix 13 is 14-digit binary information, $2^{14}$ output terminals 13A of the matrix 13 could produce output voltages with no correlation among the sampled values. Due to correlation, however, there are a number of combinations which are not possible among the possible combinations of 14-digit "0" and "1." Since those output terminals, among terminals 13A, at which the output signal does not appear can be foreseen empirically from collected data (as exemplified by FIG. 1) as to the property of the analogue signal to be handled, only those terminals which possibly produce output signals are connected to the other diode matrix 15 through terminal board 14.

Thus, each of the 14-digit codewords supplied to diode matrix 13 is converted into 12-digit codeword by means of diode matrix 13, terminal board 14, and the other diode matrix 15. This results in signal redundancy reduction and bandwidth compression of the outgoing transmission signal. As has been mentioned in the foregoing, the redundancy reduction per sample is 0.87 bit in the case of 7-digit binary code employed for the aural signal having the property of FIG. 1. Therefore, reduction of 14-digit codewords to 12 digits does not substantially impair the speech quality.

The receiving equipment to be employed in conjunction with the transmitter of FIG. 2 comprises; an input terminal 21 for receiving the incoming signal. Timing signal separator 20 is responsive to the received signal for producing a timing signal to be used for reproduction of the transmitted information. Shift register 22 is responsive to clock pulses from the timing pulse source 20 for converting the 12-digit serial codewords to parallel codewords. Diode matrix 23 is responsive to each of the 12-digit parallel codewords for producing output voltage at one of $2^{12}$ output terminals 23A thereof (in other words, conversion of 12-digit binary codeword into $2^{12}$-ary output signal). Second diode matrix 25 converts the $2^{12}$-ary signal into 14-digit parallel binary codeword and terminal board 24 connects the output terminals 23A to the $12^{14}$ input terminals of diode matrix 25 in a manner opposite to the connection of terminal board 14 of FIG. 1. Parallel-serial converter 26 converts the 14-digit parallel binary codewords into serial form and decoder 31 decodes the serial binary signal to reproduce the transmitted information at output terminal 27.

Detailed explanations of shift register 22, diode matrices 24 and 26, and parallel-serial converter 26 are omitted for the same reasons as those advanced for similar elements in discussing FIG. 2. The timing or read-out pulses for diode matrices 23 and 25 are supplied from timing pulse generator 20 similarly to diode matrices 13 and 15.

It will be understood that the terminal board 24 and the diode matrix 25 serves as redundancy reinsertion means. Accordingly, the speech quality is not impaired.

In the described embodiment, the combinations of the magnitudes of successive samples are observed after the samples were encoded. In principle, the observation or comparision of successive samples prior to encoding is also possible, although difficult.

The conversion of the $2^{12}$-ary output of terminal board 14 into 12-digit parallel binary signal by means of diode matrix 15 is not indispensable to the present invention, because the $2^{12}$-ary output may be transmitted in the form of multi-level information (in such a case, the receiving equipment has to be modified accordingly). From the practical point of view, however, the $2^{12}$-ary output should preferably be converted into binary codewords as suggested in the embodiment.

The binary signals used in the embodiment may be replaced by any arbitrary *m*-digit *n*-ary digital signals. Further, more or less than 7 digits may be allotted to each of the codewords, depending on the property of the analogue signal and allowance of the overload noise, without detracting from the invention.

While the principles of the invention have been described in connection with a specific embodiment, it is to be clearly understood that this description is made only by way of example.

What is claimed is:

1. A signal transmission system with redundancy reduction comprising means for sampling an information wave exhibiting correlation and for quantizing the derived information samples;

means for encoding each of said quantization samples into an *m*-digit *n*-ary codeword;

correlation means for converting a pre-selected quantity of said codewords, exhibiting correlation, into an intermediate signal;

means for converting said intermediate signal into an encoded word, reduced in number of digits from said *m*-digit *n*-ary codeword in accordance with the possible values derived by said correlation means;

means for transmitting said reduced size encoded word; and remote means for receiving and reproducing said information wave.

2. The signal transmission system with redundancy reduction claimed in claim 1 wherein said intermediate signal is a 1-digit $n^m$-ary signal.

3. The signal transmission system with redundancy reduction claimed in claim 1 wherein said preselected quantity is 2.

4. The signal transmission system with redundancy reduction claimed in claim 1 wherein said correlation means comprises a shift register and a diode matrix.

5. The signal transmission system with redundancy reduction claimed in claim 2 wherein said means for converting comprises a diode matrix having a parallel output and a parallel serial converter for converting a parallel output of said diode matrix into a serially time-spaced digital signal.

References Cited

UNITED STATES PATENTS

| | | | |
|---|---|---|---|
| 2,959,639 | 11/1960 | Pierce | 179—15.55 X |
| 3,325,601 | 6/1967 | Weber | 179—15.55 |
| 3,339,142 | 8/1967 | Varsos | 325—38.1 |

ROBERT L. GRIFFIN, *Primary Examiner.*

J. A. BRODSKY, *Assistant Examiner.*

U.S. Cl. X.R.

178—6; 179—15.55; 325—141, 321